US005393189A

United States Patent [19]

Berquist

[11] Patent Number: 5,393,189
[45] Date of Patent: Feb. 28, 1995

[54] SPREADER FOR PARTICULATE MATERIAL

[76] Inventor: Lloyd G. Berquist, 1124 Tibbals St., Holdrege, Nebr. 68959

[21] Appl. No.: 97,402

[22] Filed: Jul. 26, 1993

[51] Int. Cl.6 .............................................. B65G 65/32
[52] U.S. Cl. .................................... 414/301; 414/206; 414/300; 239/687
[58] Field of Search ............... 414/287, 288, 293, 294, 414/295, 296, 299, 300, 301, 302, 205, 206; 239/650, 651, 652, 665, 666, 668, 669, 679, 681, 687

[56] References Cited

U.S. PATENT DOCUMENTS

| 1,895,185 | 1/1933 | Finley et al. | 414/301 |
| 2,151,506 | 12/1938 | Francois-Bongarcon | 414/206 |
| 2,187,330 | 1/1940 | Rudd | 414/206 X |
| 3,315,823 | 4/1967 | Rikoff | 414/301 |
| 3,490,618 | 1/1970 | Buschbom | 414/301 |
| 3,576,262 | 4/1971 | Konschesky et al. | 414/301 |
| 3,880,300 | 4/1975 | Uhl | 414/401 X |
| 4,272,028 | 6/1981 | Cobb | 239/687 |
| 4,424,837 | 1/1984 | Farrell | 414/301 X |
| 4,557,364 | 12/1985 | Ball | 414/299 X |
| 4,995,499 | 2/1991 | Berquist . | |

FOREIGN PATENT DOCUMENTS

| 721770 | 1/1955 | United Kingdom | 414/205 |
| 739320 | 6/1980 | U.S.S.R. | 414/205 |

Primary Examiner—Frank E. Werner
Attorney, Agent, or Firm—Sean Patrick Suiter

[57] ABSTRACT

The present invention provides a spreader for a particulate material as it is being deposited in a storage bin. The spreader includes a rotatable body portion having downwardly diverging sidewalls terminating at a base. Elongated deflector blades extend out from the sidewalls and are angularly disposed with respect to the base. A deflector plate extends out from the base at the lower end of each deflector blade. The body portion is mounted within a storage bin so that its axis of rotation is disposed below the inlet port of the bin.

12 Claims, 6 Drawing Sheets

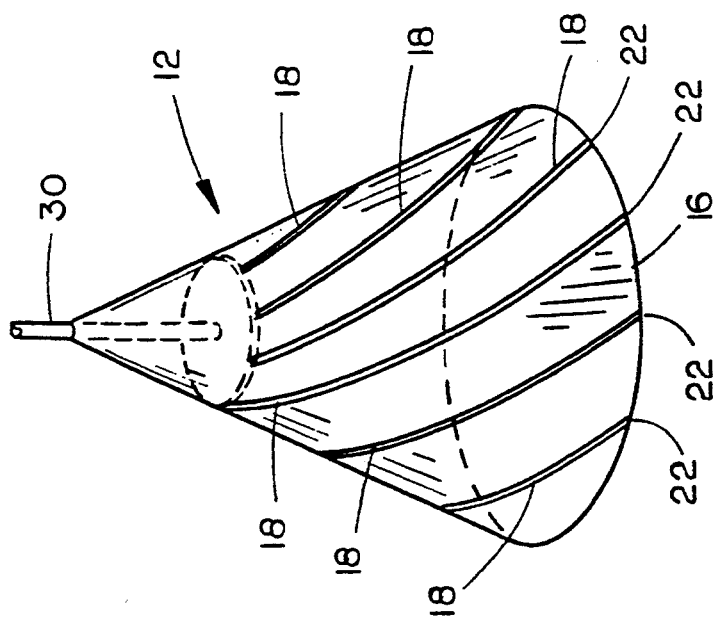
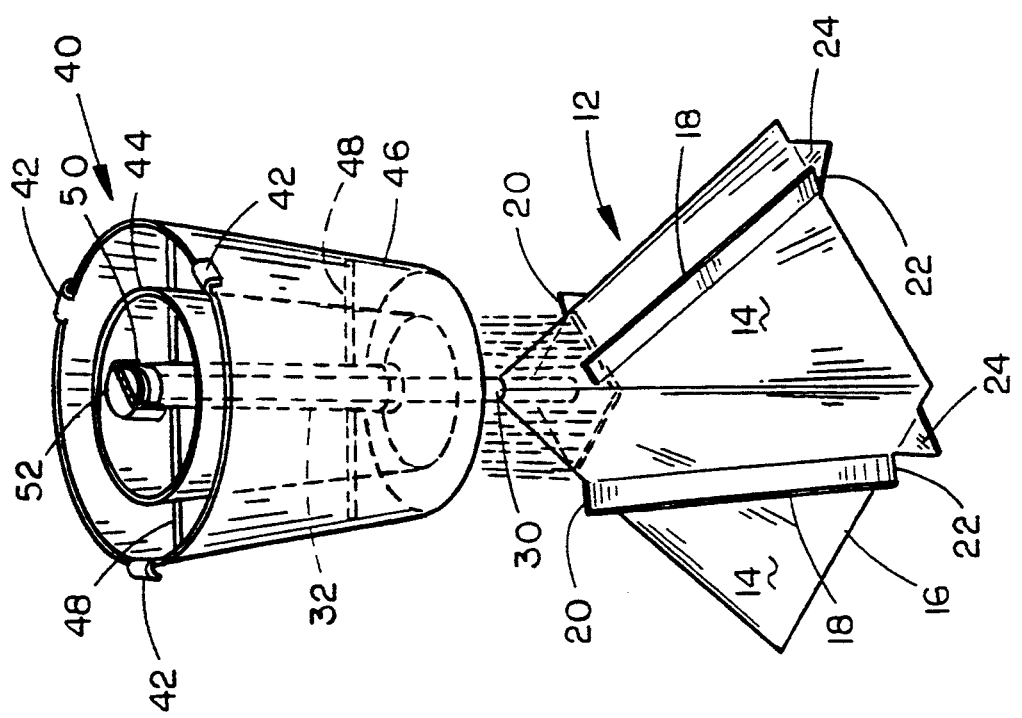

SPREADER FOR PARTICULATE MATERIAL

TECHNICAL FIELD

This invention relates to material handling devices, and more particularly to spreaders for particulate material.

BACKGROUND ART

In the storage of particulate material it is generally desirable to minimize the fracturing of the particles. Grains, such as corn, soybeans, wheat and rice, are susceptible to rapid deterioration if the seed coat is cracked or fractured. Also, the resulting fines contribute to caking of a stored mass of grain.

When a grain storage bin is filled from a central inlet port, the deposited grain and the included fines form a central mound. Although the full grains easily cascade from the center mound to the periphery of the storage bin, fines and fractured grains tend to concentrate at the center of the bin and cause caking. This caking condition inhibits ventilation and results in the build-up of heat and moisture which leads to the further deterioration of the stored grain. Also, the concentrated caked material forms a solid center core that may fall down over the grain withdrawal outlet and inhibit the bin unloading operation. In extreme cases dynamite has been used to fracture the hard center core that blocks the withdrawal outlet.

Although material spreaders are available, most include complicated structures and require power drives to operate. Simple, reliable spreaders are not currently available.

Those concerned with these and other problems recognize the need for an improved spreader for particulate materials.

DISCLOSURE OF THE INVENTION

The present invention provides a spreader for a particulate material as it is being deposited in a storage bin. The spreader includes a rotatable body portion having downwardly diverging sidewalls terminating at a base. Elongated deflector blades extend out from the sidewalls and are angularly disposed with respect to the base. A deflector plate extends out from the base at the lower end of each deflector blade. The body portion is mounted within a storage bin so that its axis of rotation is disposed below the inlet port of the bin.

As material is deposited into the bin through the inlet port, the falling material contacts the angled deflector blades and causes the body portion to rotate. Each blade divides the deposited material into a separate stream and the corresponding deflector plate feathers each material stream out from the center of the bin. This dispersion exposes a larger surface area of the particulate material to the ambient air which increases the drag force on the falling particle and acts to decrease the velocity of the particle, thus minimizing particle fracture.

In situations where the bin is over-filled so the grain touches or covers the spreaders, there will be no damage to the spreader. Likewise, when grain is removed from the over-filled bin, the grain will simply fall away from the spreader and it is ready to be used again.

An object of the present invention is the provision of an improved spreader for particulate material.

Another object is to provide a spreader that is adapted to use in grain storage bins.

A further object of the invention is the provision of a spreader that is operated by the kinetic energy of the material being deposited into the storage bin.

Still another object is to provide a spreader that disperses material and provides exposure of a large surface area of the material to increase the drag force on falling particles to minimize fracture.

A still further object of the present invention is the provision of a spreader that is uncomplicated in structure, durable and easy to maintain.

Yet another object is to provide a spreader that minimizes the build-up of particle fines at an area in the bin storage chamber thus minimizing the tendency of the material to cake.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 7 is a perspective view showing a rotatable mounting similar to that illustrated in FIG. 6 but wherein the spreader body is supported and fed by a double conduit feeding cone adapted to be supported by the storage bin below the inlet opening by bracket extensions or hanging chains; and FIG. 8 is a partial perspective view illustrating an alternate spreader having a cone-shaped body.

BEST MODE FOR CARRYING OUT THE INVENTION

Figure 1:
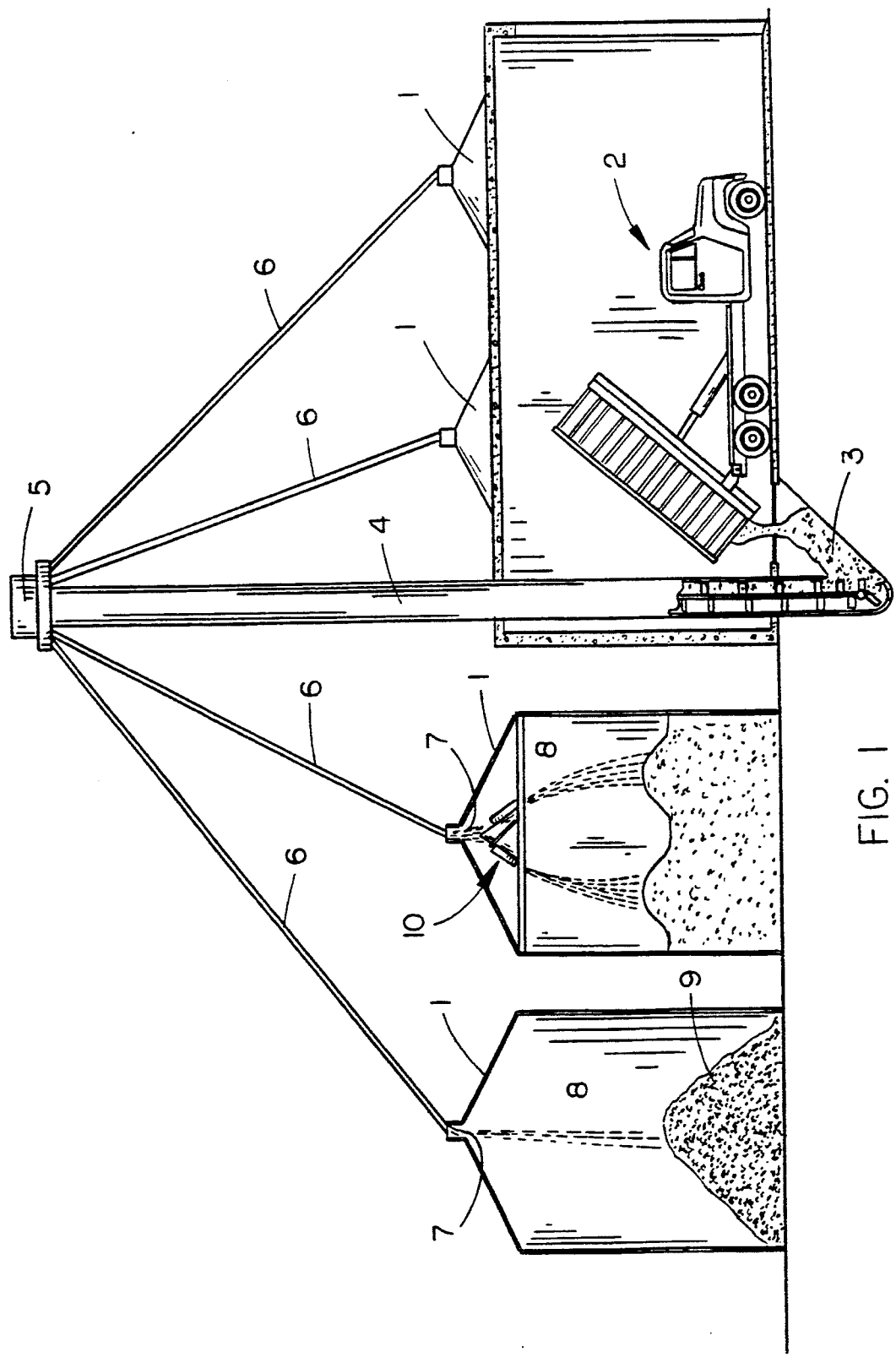
FIG. 1 is an elevational view, partially in section, illustrating a grain handling facility wherein one of the storage bins is equipped with the spreader of the present invention.
Figure 2:
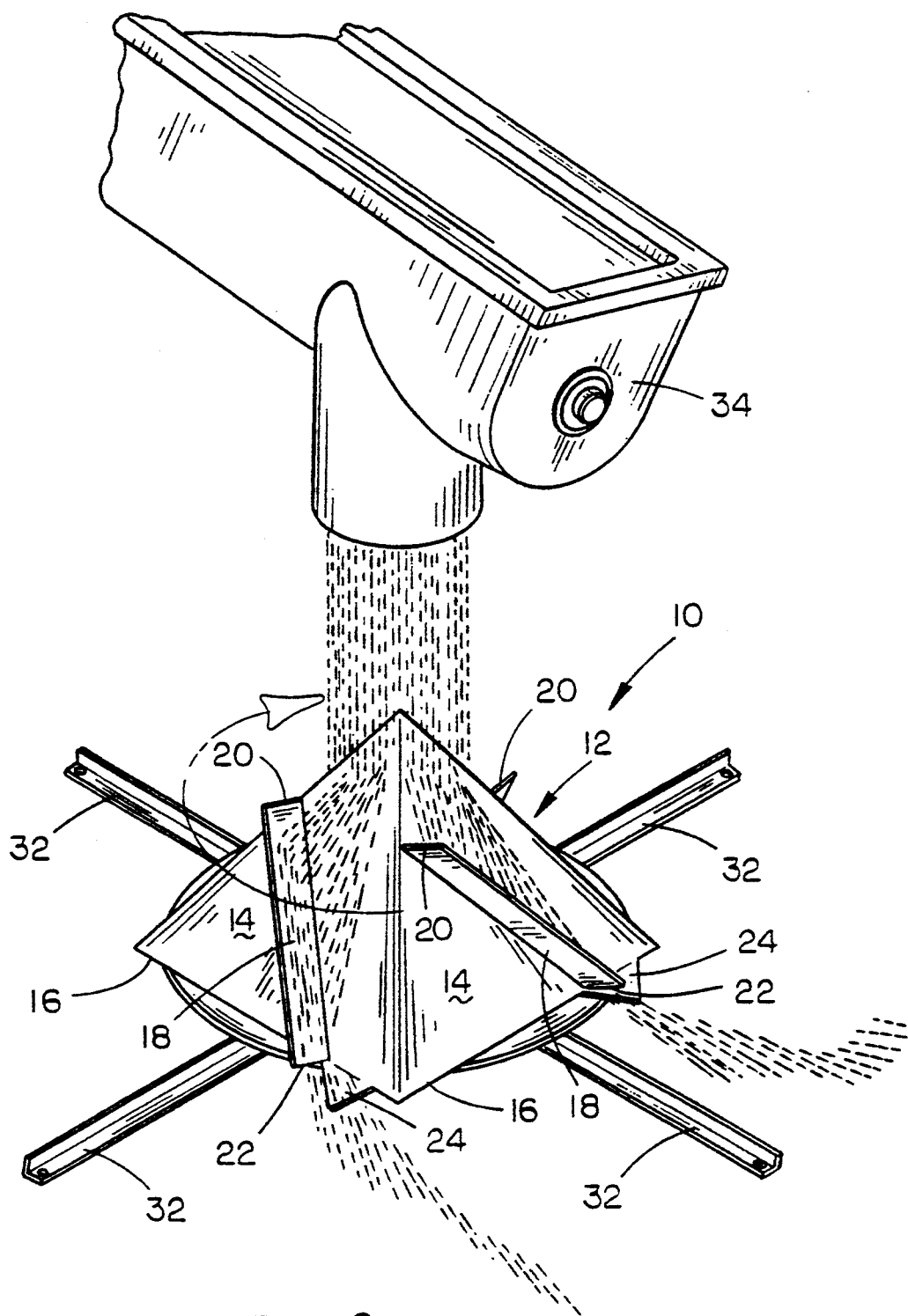
FIG. 2 is a perspective view of one embodiment of the spreader having a pyramid-shaped body and a rotatable mounting disposed below the spreader body.
Figure 3:
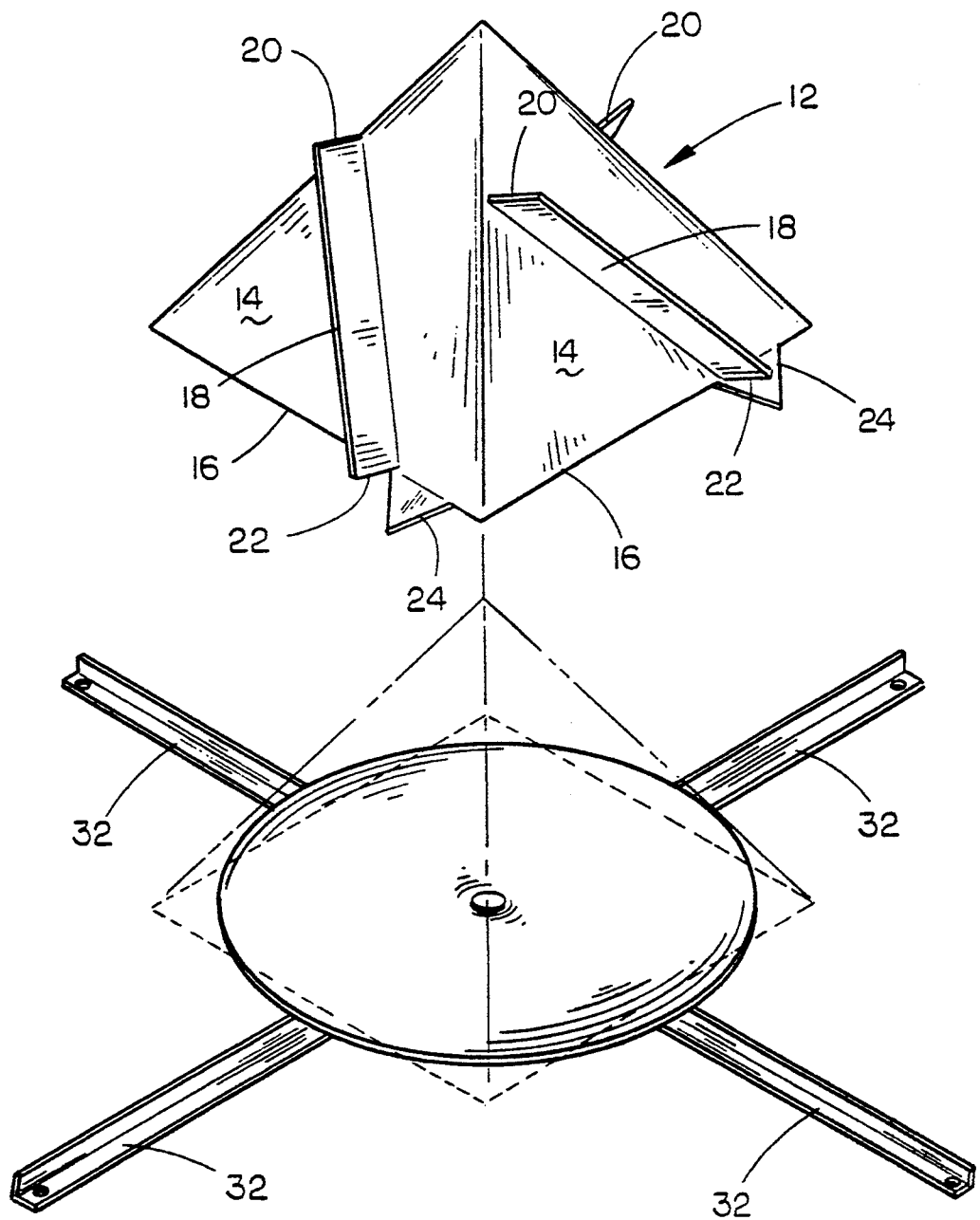
FIG. 3 is an exploded perspective view of the FIG. 2 embodiment.
Figure 4:
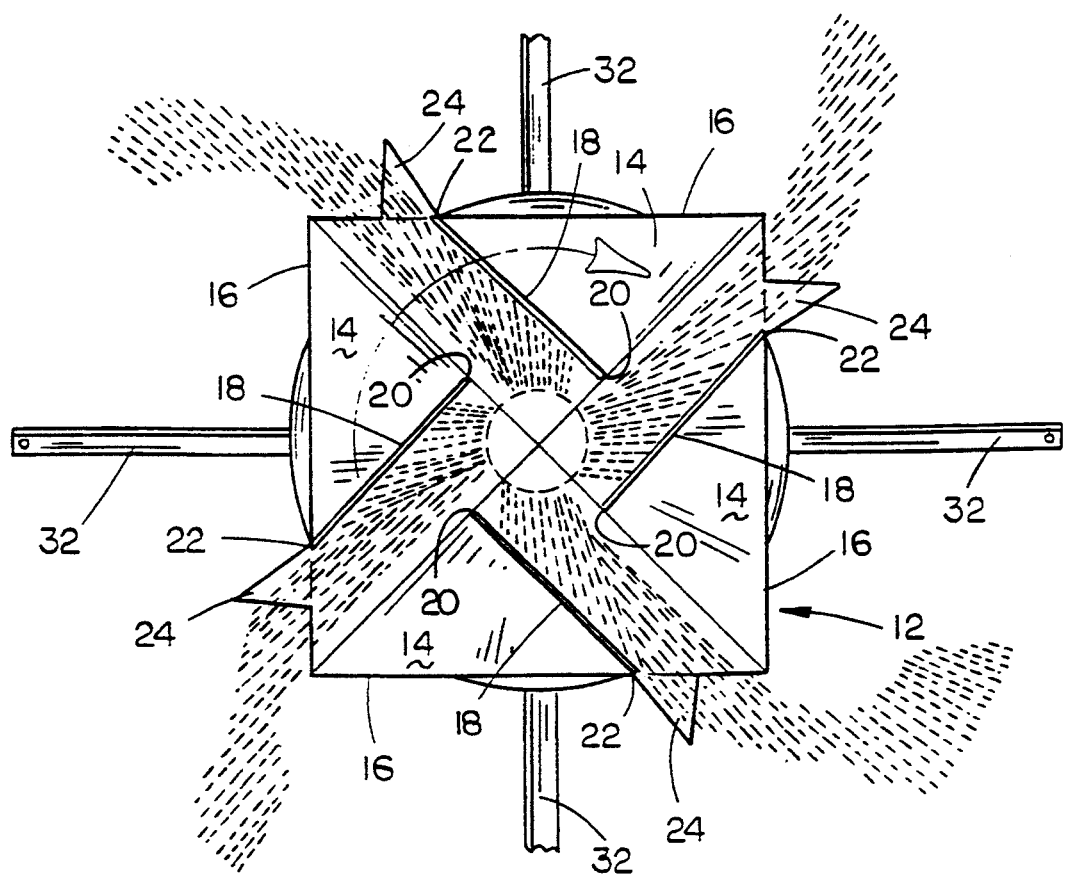
FIG. 4 is a top plan view illustrating the direction of rotation of the spreader body and the distribution pattern of the grain.

Referring now to the drawings, wherein like reference numerals designate identical or corresponding parts throughout the several views, FIG. 1 shows a grain handling facility including a number of storage bins (1). After harvest, grain is transported to the facility by trucks (2) and dumped into a grain pit (3). The grain is then moved through a vertical conveyor leg (4) to a distributor (5). The grain is then selectively charged to one of the storage bins (1) through a conduit (6). The first bin (1) to the left of FIG. 1 is not equipped with a spreader and grain is deposited through the inlet port (7) to the storage chamber (8) and is deposited in a central mount (9) within the storage chamber (8). The second bin (1) to the right of the first is equipped with the spreader (10) of the present invention.

As best shown in FIGS. 2–5, one embodiment of the spreader (10) includes a rotatable pyramid-shaped body portion (12) having four triangular sidewalls (14) and a square base (16). An elongated deflector blade (18) is attached to each sidewall (14) and is angularly disposed with respect to the base (16). The upper end (20) of each blade (18) is positioned generally vertically above the lower end (22) of the next adjacent blade (18). A deflector plate (24) extends out from the base (18) at the lower end (22) of each blade (18).

Figure 5:
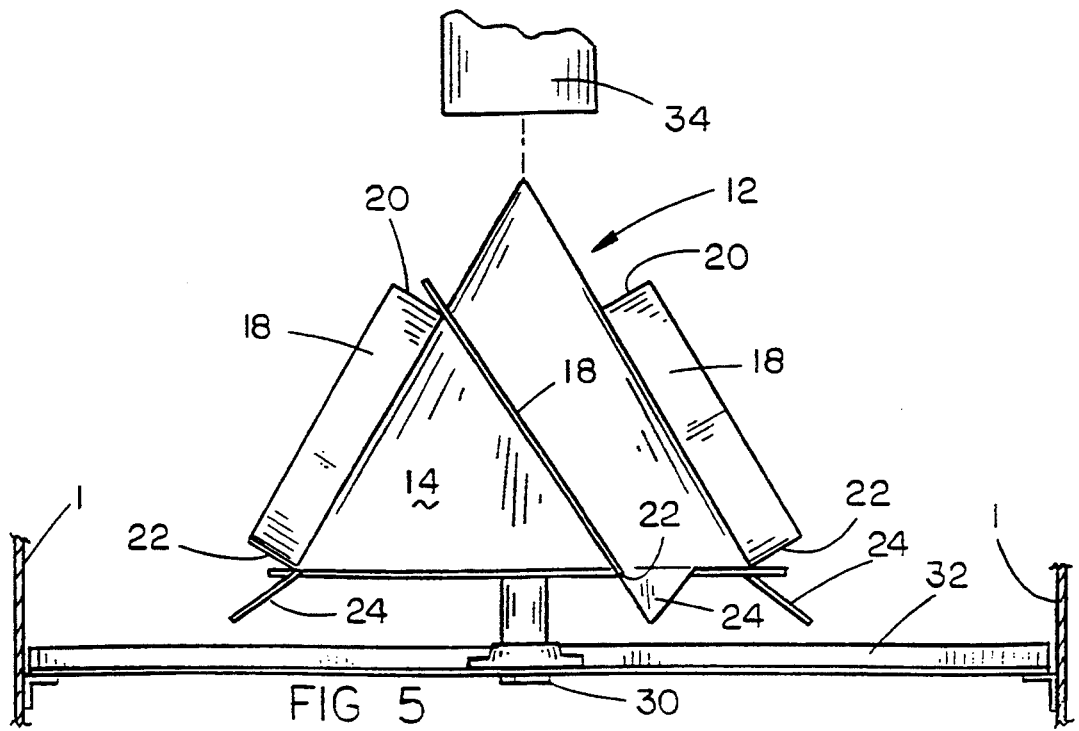
FIG. 5 is a partial side elevational view of the FIG. 2 embodiment showing the frame for the rotatable mounting attached to the bin sidewalls.
Figure 6:
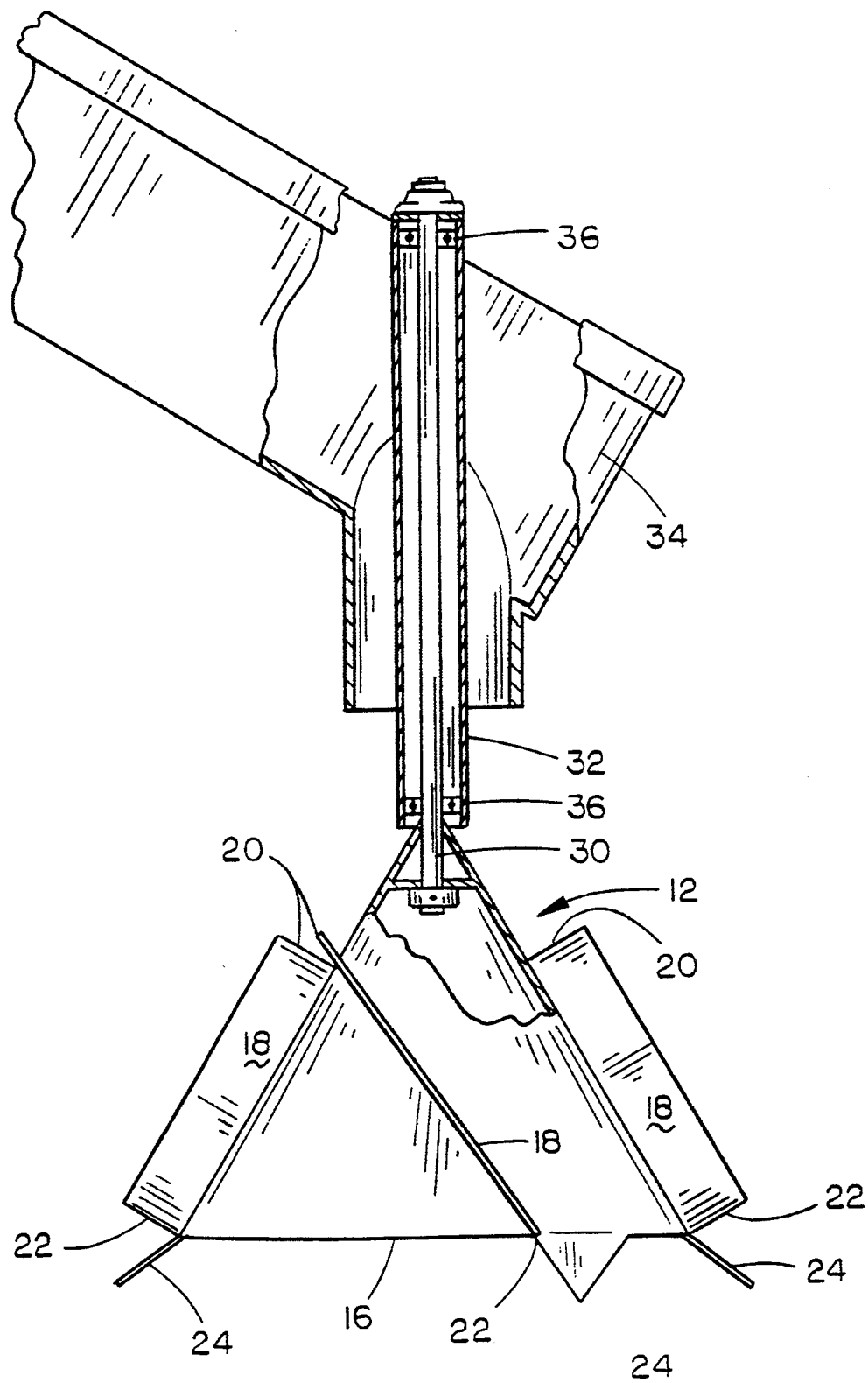
FIG. 6 is a side elevational view, partially in section, illustrating an alternate rotatable mounting disposed above the spreader body and supported by the end of a grain downspout from a conveyor belt charging system.

As shown in FIG. 5, the body portion (12) is rotatably mounted above a vertical spindle (30) supported on horizontal frame members (32) mounted to the sidewalls of a storage bin (1). The embodiment of FIG. 6 shows the body portion (12) rotatably mounted below a vertical spindle (30) which is supported by a sleeve or frame member (32) attached to a grain downspout (34). Bearings (36) allow for free rotation of the spindle (30) within the sleeve (32) and thus free rotation of the body portion (12) within the grain bin (1).

FIG. 7 shows a body portion (12) rotatably mounted from a double conduit feeding cone (40) which is supported below the inlet port (7) by bracket extensions or hanging chains attached to tabs (42). The inner cone (44) centers the flow of grain over the body portion (14). The bottom of the inner cone (44) is restricted to slow the flow of grain and the outer cone (46) receives the excess grain. The spindle (30) and sleeve (32) together with the inner and outer cones (44 and 46), are interconnected by braces (48). A steel pin (50) is used at the top of the spindle (30) and a dust cap (52) extends over the spindle to eliminate dust and wear.

The embodiment illustrated in FIG. 8 shows a cone-shaped body portion (12) and a plurality of blades (18) that may be formed of rod or square stock.

In operation, the spreader (10) is positioned to receive the flow of grain into a bin (1) which could be fed by an auger, a downspout, or conveyor belts. Grain contacts the blades (18) and causes the body portion (12) to rotate. Each blade (18) divides the grain into a separate stream (FIG. 4) and the deflector plate (24) feathers each stream out from the center of the bin (1). This dispersion exposes a large surface area of grain to the ambient air. This increases the drag on each grain particle and acts to decrease the velocity to minimize particle fracture. Also, the dispersion acts to scatter the existing fines in the grain and prevents the concentration of fines in a central location that leads to caking and grain deterioration.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A spreader for a material storage bin having an inlet port, means for admitting particulate material through the inlet port, and a storage chamber disposed below the inlet port, the spreader comprising:

a rotatable body portion having at least three triangular side walls, an axis of rotation and including downwardly diverging sidewalls terminating at a base; a plurality of elongated deflector blades attached to and extending out from the sidewalls, the blades being angularly disposed with respect to the base and having an upper end and a lower end;

means for rotatably mounting the body portion within the storage bin such that the axis of rotation is disposed below the inlet port; and further including a deflector plate attached to the base and disposed to extend outwardly from a portion of the base adjacent the lower end of the deflector blades so as to divide falling grain into separate streams whereby the deflector plate feathers each of said separate streams out from a center of the bin and exposes a larger surface area of grain particles to the ambient air thereby increasing drag on each grain particle so as to act to decrease grain particle velocity such that grain particle fracturing is minimized and the grain is evenly distributed.

2. The spreader of claim 1 wherein the body portion is pyramidally shaped.

3. The spreader of claim 2 wherein the elongated deflector blades extend generally parallel to one side of their respective sidewalls, the upper end of one deflector blade being disposed generally vertically above the lower end of the next adjacent deflector blade.

4. The spreader of claim 1 wherein the body portion is conically shaped.

5. The spreader of claim 4 wherein each elongated deflector blade extends generally parallel to the next adjacent elongated deflector blade.

6. The spreader of claim 1 wherein the mounting means includes a frame operably attached to the storage bin, and a spindle having a vertically directed axis operably rotatably attached to the body portion.

7. The spreader of claim 6 wherein the frame is generally horizontally disposed within the storage chamber.

8. The spreader of claim 6 wherein the frame is generally vertically disposed to depend down from the storage bin inlet port.

9. The spreader of claim 8 wherein the frame supports a first downwardly diverging material conduit disposed around the spindle and having a lower opening disposed above the body portion.

10. The spreader of claim 8 wherein the frame further supports a second downwardly diverging material conduit disposed around the first material conduit and having a lower opening disposed above the body portion.

11. The spreader of claim 10 wherein hanging brackets are attached to the second material conduit, the hanging brackets being disposed to removably attach to the storage bin near the inlet port.

12. An apparatus for spreading particulate matter into a storage bin as said particulate matter is discharged from the outlet port of a downwardly directed conduit, comprising:

a generally pyramidally shaped distributor having a polygonal base, at least three triangular sidewalls, and an apex;

a frame for rotatably securing said distributor beneath the outlet port such that the apex of said distributor is directed at said outlet port;

said base of said distributor having a dimension such that substantially all particulate matter leaving the outlet port of said downwardly directed conduit will strike said distributor sidewalls; and a deflector plate mounted to each of said distributor sidewalls such that particulate matter exiting said outlet port will strike at least some portion of a blade such that at least some portion of the particulate matter linear kinetic energy will be converted to distributor rotational kinetic energy such that the distributor is caused to rotate at a rate generally dependent on the output rate of particulate matter from said outlet port and said particulate matter is generally envenly dispersed within said bin and whereby falling grain is divided into separate streams and the deflector plate feathers each stream out from a center of the bin and exposes a large surface area of grain particles to the ambient air thereby increasing drag on each grain particle so as to act to decrease grain particle velocity such that grain particle fracturing is minimized.

* * * * *